J. Johnson,
Bread Machine.
Nº 21,683.　　　　　Patented Oct. 5, 1858.
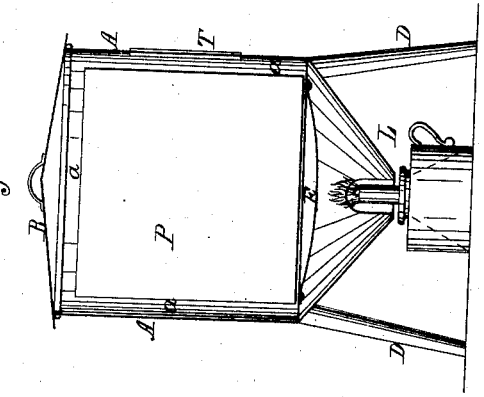
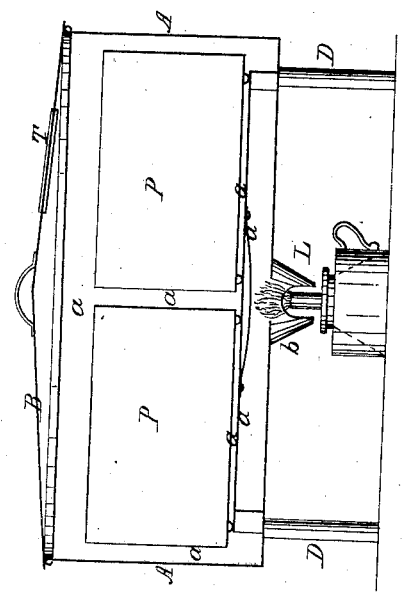

UNITED STATES PATENT OFFICE.

J. JOHNSON, OF NEW YORK, N. Y.

APPARATUS FOR RAISING DOUGH FOR BREAD.

Specification of Letters Patent No. 21,683, dated October 5, 1858.

*To all whom it may concern:*

Be it known that I, JOSEE JOHNSON, of the city, county, and State of New York, have invented a new and Improved Mode of Raising Dough; and I do hereby declare that the following is a full and exact description thereof, reference being had to the accompanying drawings and to the letters of reference marked thereon.

The nature of my invention consists in attaching a brake or reversed arch to the bottom (*a, a*) for giving an even temperature to the heat throughout the whole length of the box; and the reversed conical shield for receiving and concentrating the flame of the lamp, and slotted in such a manner that the lamp may be easily placed in its position and be removed when desired without removing the box.

To enable others skilled in the art to make and use my invention I will proceed to describe its construction and operation.

I construct my dough raiser, as before stated.

In Figure I A A is the box or pan made of tin or any suitable metal, say about fourteen inches long, and five inches deep. P P are dough pans made of such a size as to be admitted into the box or pan A A, leaving about one half inch space all around them. B is a cover to said box. T the thermometer; *a, a,* the stand or brake on which the pans are set. *a'* is a plate attached to the stand *a* and forms a double brake against which the heat strikes and is distributed to each end and side of the box.

By this arrangement, (having the brake double at the point where the heat strikes it, and the open space between the plates *a*, and *a'* for the air to pass through) it will be found that an equal degree of heat is given to the entire length of the bottom, so that the dough will rise equally at all points, and the heat be uniform in all parts of the box. *b*, is an inverted cone attached to the bottom of the box, and has an opening *c*, on on side to allow the tube of the lamp to pass in, so that, the lamp is easily adjusted. It will be further seen, that the lower edges of the cone *b* serve as a guide to the lamp and prevent the flame from coming against the sides of the funnel and thus melt the solder. It also enables me to dispense with a cover or box for the lamp, by which means the fluid in the lamp does not become heated, but is always kept cool, which, with the great facility of adjustment I find of great advantage in my invention. D, D, are legs upon which the box is held at sufficient height to allow the lamp L to go beneath.

Fig. II is a smaller apparatus for the same purpose, having but one pan.

It is found by experience that if dough is kept for a certain length of time submitted to the right temperature, it will rise light and will, without the employment of yeast, and even with yeast, it is necessary, in order to raise dough well that it should be kept under the right temperature until it has sufficiently risen, which is very easily done by this simple apparatus as may be at once seen. Suppose the pans be filled with dough—the box A A closed by the cover B—the lamp L lighted—after a few minutes the thermometer will shown to what degree of heat the lamp will keep the dough. If found too high or too low the lamp can be easily regulated so as to give the desired temperature which is found to be about 100° Fah.

To prepare the dough it is only necessary to mix the flour with lukewarm water, to the consistency of batter, then pour it into the pan, or pans about one third full, and set it in the box, the pans resting on the brake *a*, then close the box, by putting on the cover, and place the lamp beneath the brake, and see that the thermometer rises to 100°, keep at this heat, this batter should be kept at this heat for five hours, when it will be sufficiently raised. It may then be taken out, and flour added, sufficient to make the dough of the consistency for bread, rolls, &c. and then set back again in the box as before, and kept at the same temperature about an hour, when it will be found that the dough is raised and fit for baking. Then take out the pan and place it in the stove or oven and bake as usual.

What I claim and desire to secure by Letters Patent is—

The double brake *a*, and *a'* in combination with the conical shield *b* operating as described and for the purposes set forth.

JOSEE JOHNSON.

Witnesses:
JNO. M. CARR,
M. M. KELTON.